(12) United States Patent
Peters et al.

(10) Patent No.: US 6,981,210 B2
(45) Date of Patent: Dec. 27, 2005

(54) SELF-MAINTAINING WEB BROWSER BOOKMARKS

(75) Inventors: Marcia L. Peters, Durham, NC (US); John R. Hind, Raleigh, NC (US); Soumitra Sarkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 09/784,882

(22) Filed: Feb. 16, 2001

(65) Prior Publication Data

US 2002/0116411 A1  Aug. 22, 2002

(51) Int. Cl.[7] .......................... G06F 17/24; G06F 17/27
(52) U.S. Cl. ................ 707/511; 715/500.1; 715/501.1; 715/500; 715/513; 709/245; 709/246; 709/250
(58) Field of Search .................... 715/500.1, 501.1, 715/500, 511, 513; 709/245, 246, 250

(56) References Cited

U.S. PATENT DOCUMENTS

| | | | | |
|---|---|---|---|---|
| 5,813,007 | A | | 9/1998 | Nielsen .................. 707/10 |
| 5,978,828 | A | * | 11/1999 | Greer et al. ............. 709/224 |
| 6,012,098 | A | | 1/2000 | Bayeh et al. ............ 709/246 |
| 6,018,342 | A | * | 1/2000 | Bristor ................... 345/840 |
| 6,037,934 | A | * | 3/2000 | Himmel et al. .......... 345/760 |
| 6,041,360 | A | | 3/2000 | Himmel et al. .......... 709/245 |
| 6,182,113 | B1 | * | 1/2001 | Narayanaswami ....... 709/203 |
| 6,208,995 | B1 | * | 3/2001 | Himmel et al. .......... 707/104.1 |
| 6,211,871 | B1 | * | 4/2001 | Himmel et al. .......... 345/744 |

OTHER PUBLICATIONS

"An Exploration of Dynamic Documents," http://home.netscape.com/assist/net_sites/pushpull.html, printed Dec. 20, 2000.
RFC 1945, "9.3 Redirection 3xx".
RFC 2068, "10.3 Redirection 3xx".
"The WDVL: Meta Refresh," http://wdvl.com/Location/Meta/refresh.html, printed Nov. 14, 2000.
Alan Richmond, "HTML's Meta-tag," http://www.internet.com (1999-2000).
Fielding et al., "Hypertext Transfer Protocol—HTTP/1.1," Network Working Group, Standards Track, pp. 1-114 (Jun. 1999).

* cited by examiner

Primary Examiner—Stephen Hong
Assistant Examiner—Joshua D Campbell
(74) Attorney, Agent, or Firm—Synnestvedt & Lechner LLP; Stephen A. Calogero (57) ABSTRACT

The present invention provides a method for automatically updating bookmarks stored by a web browser when the bookmarked URL is invalid and a redirect to an alternate URL is specified. In accordance with the present invention, a web page author places redirect markups in the HTML or XML file associated with a particular URL. When this redirect markup in the HTML or XML file is received by the web browser, the user of the browser is given the option of replacing the existing bookmarked original URL with the redirect URL. Further, if desired, the bookmark, now containing the redirect URL, may also be modified to include the bookmarked original URL, so that, if desired, the user of the browser can try to reach the original URL if the redirect URL is no longer functional.

3 Claims, 5 Drawing Sheets

SELF-MAINTAINING WEB BROWSER BOOKMARKS

BACKGROUND OF THE INVENTION

1. Field of the Invention

This invention relates generally to information retrieval in a computer network. More particularly, it relates to an improved method for maintaining bookmarks in a Web browser for retrieving Web pages in an Internet environment.

2. Description of the Related Art

It is well known to couple computer systems into a network of computer systems so that the collective resources available within the network may be shared among users. The Internet has brought this sharing of computer resources to a much wider audience.

The World Wide Web, or simply "the Web", is the Internet's information retrieval system; it is the most commonly used method of transferring data in the Internet environment. Client machines accomplish transactions to Web servers using the Hypertext Transfer Protocol (HTTP), which is a known application protocol providing users access to files (e.g., text, graphics, images, sound, video) using a standard page description language known as the Hypertext Markup Language (HTML). HTML provides basic document formatting and allows the developer to specify "links" to other servers and files. In the Internet framework, a network path to a server is identified by a Uniform Resource Locator (URL) having a specific syntax for defining a network connection.

Retrieval of information is generally achieved by the use of an HTML-compatible "browser", e.g., Netscape Navigator, at a client machine. Web browsers have become the primary interface for access to many network and server services. When the user of the browser specifies a link via a URL, the client issues a request to the domain name service (DNS) to map a hostname in the URL to a particular Internet address (called an IP address) at which the server is located. The naming service returns a list of one or more IP addresses that can respond to the request. Using one of the IP addresses, the browser establishes a connection to a server. If the server is available, it returns a document or other object (often formatted according to HTML, which is the standard for Web page description, or more recently in XML with the help of an ancillary style sheet containing presentation instructions).

The entry of the URL in the entry field of a browser can be a difficult task for many users. While the URL for the main Web page of a major company can be relatively brief, e.g., http://www.ibm.com/, subsidiary pages can have very lengthy and non-intuitive URLs. As an example, the URL for the "Small Business Center" page, an internal page accessible from the main IBM web page, is as follows:
http://www-1.ibm.com/businesscenter/us/smbusapub.nsf/detailcontacts/SBCenter5988.

Recognizing the difficulties involved, the developers of browsers have provided a useful means of returning to a favorite URL, by including with the browser the ability to create and store "bookmarks" (also called "favorites") in the browser program.

Web browsers offer many options in the user interface for creating a bookmark list. Basic options let the user add and access a page through a pop-up menu on the location toolbar or through a menu pulldown from the main menu bar. A simple way to add a bookmark for a favorite page is to key in the desired URL to travel to the page and, once there, open the "Bookmarks" menu and choose the "Add Bookmarks" selection. This set of actions adds the URL of the current page as an item in the "Bookmarks" menu. Alternatively, instead of keying in the URL to travel to a page, the user might click on a "hyperlink" in a well known manner to travel to the Web page identified by the hyperlink. For example, from a home page, the user might click on a hyperlink to travel to an internal page within the website. Once on the desired page, the user can add the bookmark as described above.

Each browser has its own unique format for bookmarks. Netscape browsers, for example, place bookmarks in an HTML file as a table entry. The table entry may include other fields in addition to the URL to assist in the bookmark management process provided by the browser. Thus, the following Netscape bookmark entry:

<DT><A HREF="http://st7.yahoo.net/alix/" ADD_DATE="Aug. 30, 1999" LAST_VISIT="Sep. 23, 2000" LAST_MODIFIED="Dec. 22, 1999">Alix Sales-Memory Cards</A>

This bookmark directs the browser to the URL "http://st7.yahoo.net/alix/" and also carries the date on which the bookmark was added to the bookmark file (ADD_DATE="Aug. 30, 1999"); the date the URL was last visited (LAST_VISIT="Sep. 23, 2000"; and the date the URL was last changed (LAST_MODIFIED="Dec. 22, 1999") (the actual format used for designating the date may differ; the familiar "month-day-year" format shown is for the purpose of example only). The "name" of the bookmark, which is displayed to the user in the bookmark menu, is "Alix Sales-Memory Cards."

Once created, bookmarks offer a means of quick page retrieval. The user can cause the browser to display the bookmark list and select among the bookmarks to go directly to a favorite page. Thus, the user is not forced to enter a lengthy URL nor retrace the original route through the Internet (i.e., hyperlink to hyperlink to hyperlink, etc.) by which he/she may have arrived at the Web site. Once a bookmark is added to a bookmark list, in general, the bookmark becomes a permanent part of the browser until removed. The permanence and accessibility of bookmarks have made them a valuable means for personalizing a user's Internet access through the browser.

Despite their usefulness, the current methods of implementing bookmarks are not without their flaws. There are several instances where a bookmark might become invalid. For example, a website owner may have temporarily or permanently moved or renamed the page; thus, the URL that was bookmarked will no longer exist, or may hold different content than it did when the web user bookmarked it. Alternatively, the website owner may have ceased operations and the website may actually no longer exist.

Using current browsers, when a bookmark is judged invalid by a user (e.g., after either failing to access the desired site or being redirected to a different site as discussed below), it is up to the user to decide whether to discard the bookmark (by deleting it from the bookmark list), update it to reflect the new information (by manually revising the URL associated with the bookmark), or create a new bookmark (using the "Add bookmark" option discussed above). To most users this is an annoyance; the average user does not wish to expend much effort in the tedious process of manually maintaining bookmarks.

The HTTP standard is the protocol used by a web server and a client browser to communicate over the Internet.

HTTP has been in use by the World Wide Web global information initiative since 1990 and is defined in a series of specifications identified by their "request for comments" (RFC) number. For example, HTTP 1.0 is defined in "RFC 1945" published in May of 1996. While various other updates have been developed, e.g., HTTP 1.1 defined in RFC 2616, June, 1999, HTTP 1.0 is still the standard that is predominantly in use today. In the discussion below, HTTP 1.0 is assumed, unless indicated otherwise. However, the manner in which this invention may be applied using HTTP 1.1 or other standards will be obvious from the description or may be learned by practice of the invention.

Using the HTTP standard, information is exchanged between the browser and the server using "headers." A typical HTTP transaction consists of a header followed optionally by an empty line and some data. The header will specify such things as the action required of the server or the type of data being returned, or a status code. The header contained in an HTTP transaction sent from a server in response to a transaction received from a browser is called a "response header."

The HTTP standard defines, among other things, a "location" field in the response header. If the location field is present and contains a URL value, a HTTP return code of either "301" (moved permanently) or "302" (moved temporarily), and if the outstanding request code was "GET," the browser is redirected to the specified URL. The HTTP standard further allows for a browser to optionally update the original link if it was in a local bookmark "container" such as a file or folder when the return code is "301". This HTTP redirection method is infrequently used, however, because the majority of web servers do not have an easy way for content authors to indicate the need to send special headers and return codes in response to a request. As a result, a workaround was developed by web authors using the HTML "META" tag to direct the browser to simulate receiving HTTP fields as a way of specifying a redirected URL "location". Essentially, the web author can use the META tag in an HTML document located at a particular URL (the original or target URL) to direct the browser to instead retrieve the document found at the URL identified in connection with the META tag (the redirect URL). However, since the HTML document containing the "META" tag (the document identified by the original URL) is actually delivered to the browser and hence is accompanied by a HTTP return code of "200" meaning that the request has succeeded ("OK"), redirecting a "location" in this manner does not actually cause a redirect and thus cannot invoke the update feature discussed above with respect to codes 301 or 302.

To solve this problem, an HTML header field called "refresh", introduced by Netscape (see http://home.netscape.com/assist/net_sites/pushpull.html) and later adopted by most browsers, began to be used to cause the browser to reload the original URL after waiting a defined number of seconds. This led to the redirect markup technique, referred to as a "Meta Refresh," used by almost all web authors today. The following is an example of HTML code for a Meta Refresh tag which "tells" the browser, as it renders the containing HTML web page, to react as if the HTTP response ("HTTP-EQUIV") had a refresh header field containing "CONTENT", a value which, in this example, would cause the browser to reload and render the page, in 2 seconds, from the specified URL:
<META HTTP-EQUIV="REFRESH" CONTENT="2; URL=HTTP://www.someware.com/new-page.html">

While this method serves the purpose of redirecting the browser to the redirect URL identified in the Meta Refresh tag, the permanent/temporary context that the HTTP specification intended to provide via the "301" or "302" return code is lost, i.e., this can only be used to redirect the browser and does nothing with respect to the bookmark.

Accordingly, a need exists for a web browser which automatically updates bookmarks when the original URL with which they are linked is invalid and redirects the user of the browser to an alternate redirect URL.

SUMMARY OF THE INVENTION

The present invention provides a method for automatically updating bookmarks stored by a web browser when the URL with which they are linked is invalid and a redirect to an alternate URL is specified. In accordance with the present invention, a web page author places redirect markups in the HTML file associated with a particular URL. When this redirect markup in the HTML file is received by the web browser, the user of the browser is given the option of allowing the existing bookmarked original URL to be replaced with the redirect URL. Further, if desired, the bookmark, now containing the redirect URL, may also be modified to include the previously-bookmarked original URL, so that, if desired, the user of the browser can subsequently try to reach the original URL in the event the redirect URL is no longer functional.

DETAILED DESCRIPTION OF THE PREFERRED EMBODIMENTS

Figure 1:
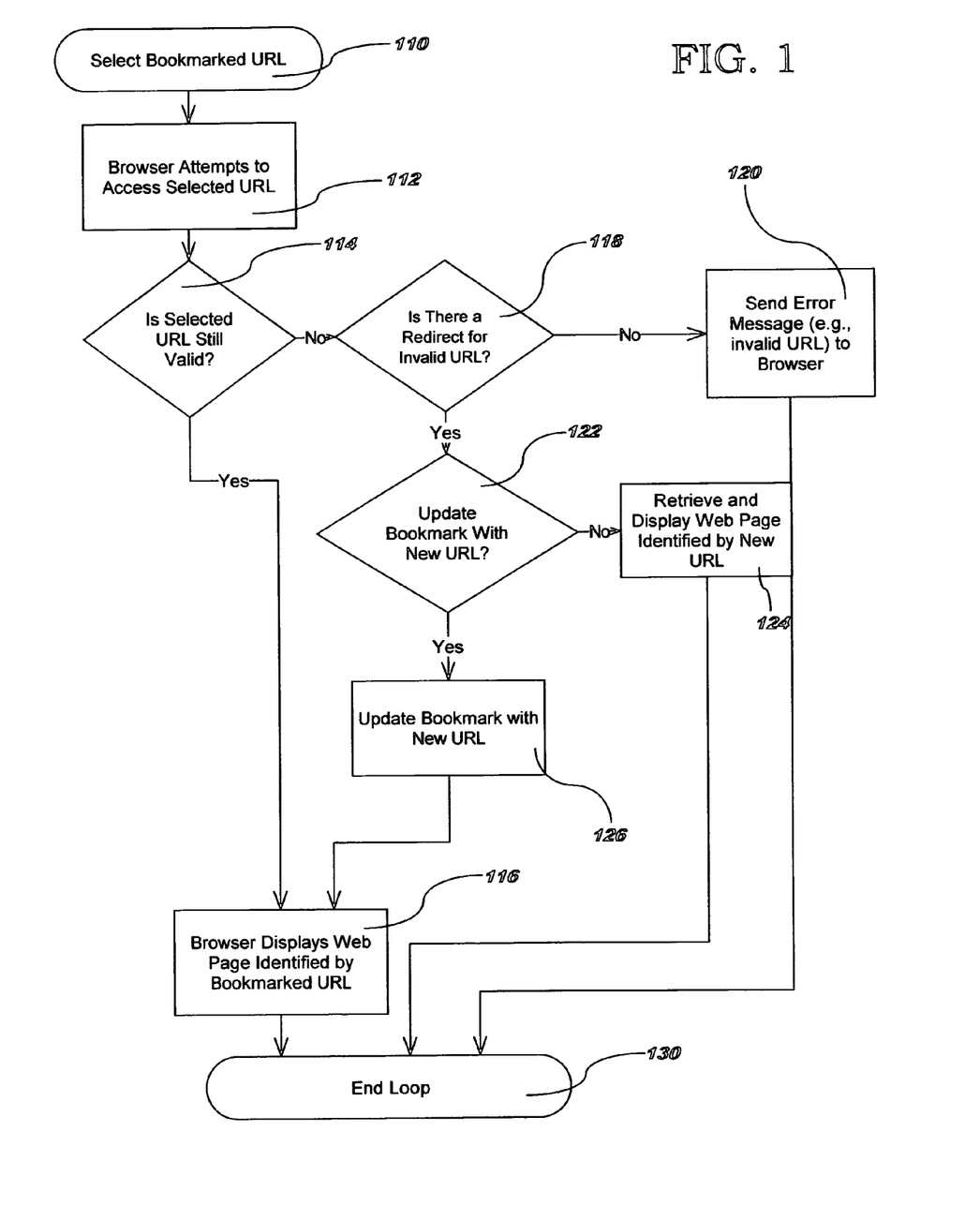
FIG. 1 is a flowchart illustrating the basic steps performed in accordance with the present invention.

FIG. 1 is a flowchart illustrating the basic steps of the present invention. At step 110, a user using a browser selects a bookmarked URL (the original URL) from the conventional bookmark list of the browser. At step 112, in accordance with conventional methods, the browser attempts to access, via the Internet, the original URL. At step 114, a determination is made as to whether or not the original URL is still valid. For example, selection of a valid bookmark will simply cause the server to return the requested page without transmitting a "redirect" instruction to the browser. If the original URL is still valid, at step 116 the Web page identified by the original URL is retrieved and displayed on the browser, completing the process with respect to the original URL (step 130). If, however, at step 114, a determination is made that the original URL is not valid, at step 118 a determination is made as to whether or not there is a redirect URL for the invalid original URL. Conventionally this determination would be made based upon, for example, a Meta Refresh tag as discussed above; however, any means of indicating the presence of a redirect URL is sufficient.

If there is no redirect URL for the invalid original URL, at step 120 a conventional error message, for example, "invalid URL", may be displayed by the browser and the process is complete (step 130). If, however, at step 118 a determination is made that there is a redirect URL for the invalid original URL, at step 122, a determination is made as to whether or not the user of the browser desires to update the bookmark list on the browser with the new redirect URL. If the answer is no, then at step 124, the browser retrieves the new redirect URL and displays the Web page associated with the new redirect URL on the browser without modifying the bookmark list.

If, however, at step 122 it is determined that the user of the browser wishes to update the bookmark list with the new redirect URL, then at step 126, in accordance with the present invention, the bookmark list is automatically updated. This can be accomplished, for example, through well-known techniques which depend on the local container technology being used (e.g., updating of a "shortcut" field in the file system; update of an HREF field should the container be a local HTML bookmark page); however, any method of updating the bookmark list can be used to accomplish the present invention.

In a preferred embodiment, this step also includes saving the old bookmark's URL value (the original URL) within the updated bookmark so that, if at a later time the new bookmarked redirect URL becomes invalid, the user may select the original URL to see if it is operational. This can be accomplished by, for example, modifying the bookmark to include a field that identifies the original URL. Thus, the following netscape bookmark file has been modified, in accordance with the present invention, to include a field called "OLD_MARK".

<DT><A HREF="http://st4.yahoo.net/alix/" ADD_DATE="Aug. 30, 1999" LAST_VISIT="Sep. 23, 2000" LAST_MODIFIED="Dec. 22, 1999" OLD_MARK="http://st7. yahoo.net/alixs/">Alixs Sales-Memory Cards</A>.

Alternatively, a comment can be included, as follows, to accomplish the same function:

<DT><A HREF="http://st4.yahoo.net/alix/" ADD_DATE="Aug. 30, 1999" LAST_VISIT="Sep. 23, 2000" LAST_MODIFIED="Dec. 22, 1999"><!-- OLD_MARK="http://st7.yahoo.net/alixs/" -->Alix Sales-Memory Cards</A>

By including the "OLD_MARK" field or comment, in this example, the old URL value is saved so that it may be used in the future should the bookmark need to be returned to its original state. Once the bookmark is updated at step 126, at step 116 the browser retrieves and displays the Web page identified by the bookmarked URL, ending the process (step 130).

Thus, in accordance with the present invention, whenever a redirect for an invalid URL (e.g. a Meta refresh tag) is received by a browser, the redirect URL contained in the redirect can be, at the option of the browser user, used to replace the bookmarked original URL. Further, by using the above-mentioned history field, that is the "OLD_MARK" field or comment discussed in the above example, the browser user will always have the option of selecting the original URL from the bookmark list when the redirect URL is no longer valid.

Figure 2:
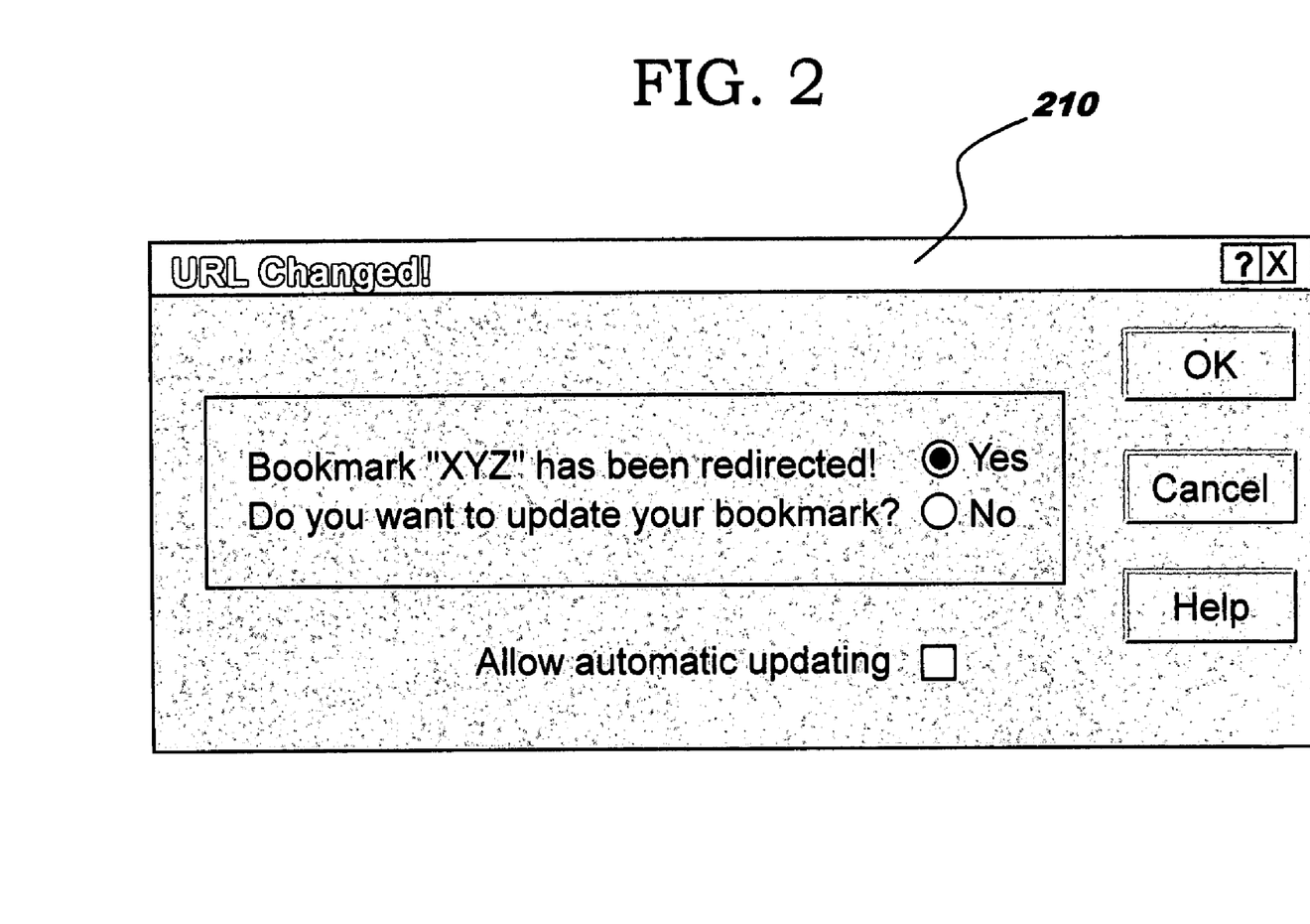
FIG. 2 illustrates an example of a "pop-up" window which can be used in connection with the present invention to indicate to the user that a bookmark has changed.

FIG. 2 illustrates a method for indicating to the user of the browser that a URL has changed and for giving the user an opportunity to update the bookmark (i.e., step 126 of FIG. 1) to store the redirect URL. As shown in FIG. 2, when a redirect (a permanently-moved http return code or an http "refresh" header containing a new URL or a "Meta Refresh" containing a new URL) is received as a direct response to a bookmark selection by the user, a pop-up window 210 is activated which solicits update instructions from the user of the browser. The solicitation could read as follows: "Bookmark XYZ has been redirected. Do you want to update your bookmark?" In a preferred embodiment, the default is in the affirmative, as illustrated in FIG. 2. If the user selects yes, the browser automatically updates the bookmark. The user may also be given a configuration option ("Allow Automatic Updating") to enable future automatic updating of bookmarks without prompting, in which case no window pops up the next time a bookmarked URL is redirected. Whether or not prompting is used, in a preferred embodiment whenever a bookmark is updated in this fashion, the browser saves the original URL's value in a history field of the updated bookmark using techniques dependent on the local bookmark container's technology so that if the update action later proves to be improper (for example, if the user was redirected because of a temporary condition at the web site), the bookmark may be restored to its original value.

Figure 3:
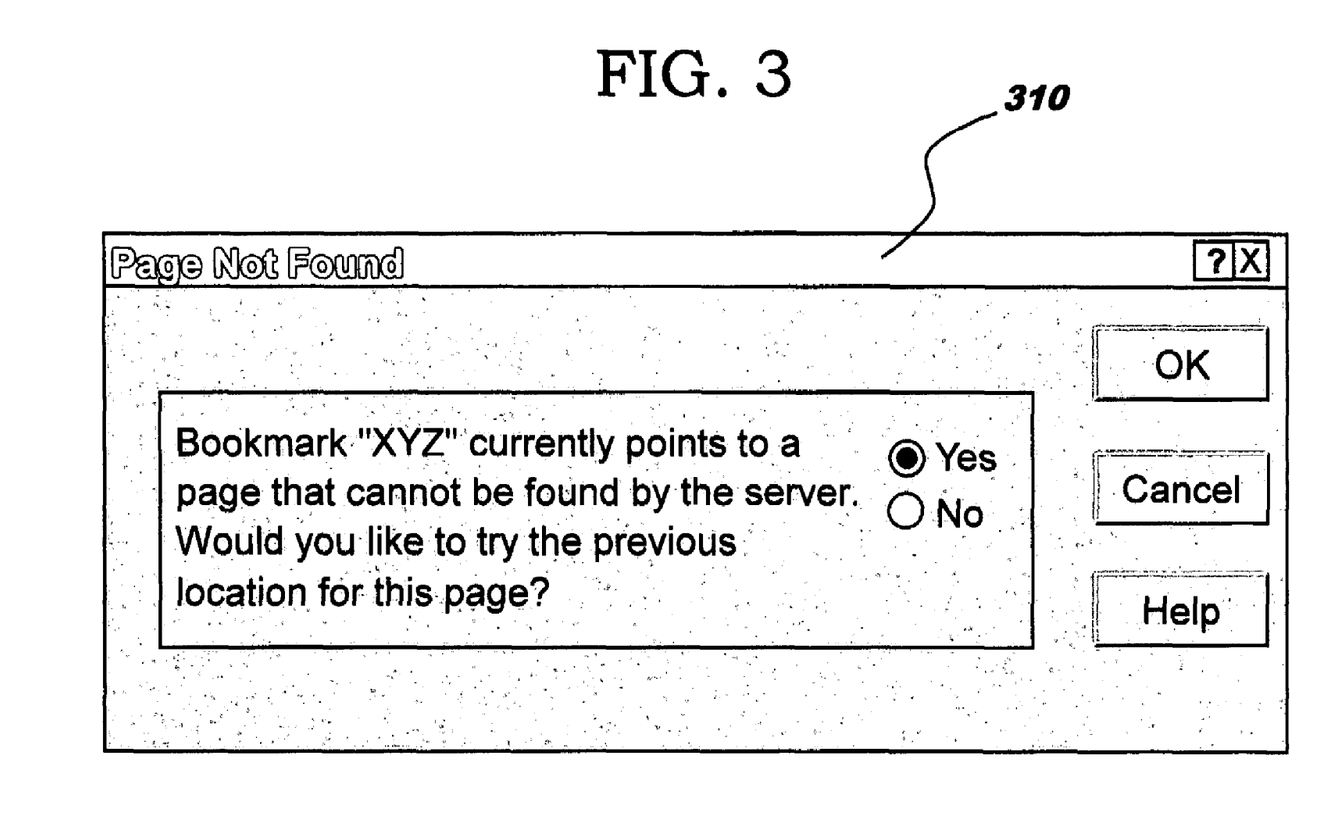
FIG. 3 illustrates an example of a pop-up window which can be used in connection with the present invention to indicate to the user that a previously-saved URL may be accessed.

FIG. 3 illustrates an example of a pop-up window 310 that could be utilized to assist the user in connection with accessing the saved original bookmarks, when appropriate. When a "page not found" condition arises from the use of a bookmark containing a saved value, window 310 pops up requesting input from the user, which could read as follows: "Bookmark XYZ currently points to a page that cannot be found on the server. Would you like to try the previous location for this page?" If the user chooses "yes," the saved original URL (e.g. "OLD_MARK") is accessed. If that results in a successful access, the saved original URL is restored as a bookmark, replacing the redirect URL.

Thus, the present invention achieves the link-update capability that the original HTTP protocol intended to provide via its "301" and "302" codes but which is not possible due to the prevailing use of Meta Refresh tags, which circumvent the use of the 301 and 302 codes. When a webmaster updating a site writes HTTP-redirect HTML markup for the former web page, directing the user to a new page, a browser exploiting the functionality of the present invention will automatically update the bookmarks (or at least offer the user the option). Since the page author places the redirect markups in the HTML file, no active server logic is required to perform the update.

The above-described steps can be implemented using standard well-known programming techniques. The novelty of the above-described embodiment lies not in the specific programming techniques but in the use of the steps described to achieve the described results.

Netscape, Microsoft, and other portals try to provide directories of web content integrated with the web browser, allowing the content and links to be maintained centrally. Similarly, other sites offer ways to store lists of bookmarks using the web as a storage medium instead of the client's local storage. The present invention is different and better because it is fully distributed (i.e., requires no third party to implement) and automatic. Bookmarks stored on the client's PC are automatically updated and there is no need for central administration or a central storage location.

In the above-described embodiment, the automated bookmarking process is an interactive model in which bookmark updating occurs during the browsing process, and a bookmark is only updated at the time when a user tries to access a particular bookmarked URL. However, in an alternative embodiment, a "batch model" can also be utilized. In accordance with this alternative embodiment, an automatic update program can be invoked periodically (e.g. on a time-scheduled basis) or each time the browser is launched. As an example, the batch program could cause the browser to automatically check all bookmarks stored by the browser and update, where appropriate, its bookmark storage.

Following is an example of typical steps that would be performed by a batch bookmark program involving a bookmark redirect:

1. User of batch bookmark update program specifies location of bookmark file, and browser type.
   * Browser type used to identify bookmark file format.
2. Batch program opens bookmark file, creates a temporary output file.
3. For each bookmark in the file, it performs the following logic in steps 3a, 3b, and 3c.
   a. Parse the bookkmark entry, extracting the URL it refers to.
   b. Send an HTTP GET request to that URL, building the protocol header, etc.
   c. Process the HTTP response. There are three cases to be handled.
      i. If it was a "redirect" response (HTTP 301 return code or a 200 return code with an HTML document containing the redirect meta-tag sequence), then the site has moved, and the body of the response contains the URL of the new site. Write out the new bookmark, referencing the new URL, to the temporary output file.
      ii. Else, it was some other response indicating that the URL is permanently unavailable. In that case, the bookmark is invalid.
      iii. Else, it was a valid response (HTTP response code 200) or temporarily unavailable. The bookmark is still valid. Copy the existing bookmark entry to the temporary output file.
4. Close temporary output file. Delete bookmark file (or save as a historical back-up file). Rename temporary output file as original bookmark file.

The above bookmark batch program steps are provided for the purpose of example only. It is understood that there are many different batch programs that could be invoked to automatically, either on a periodic basis or upon the occurrence of a predetermined event, cause the automatic updating of the present invention to be performed.

Figure 4:
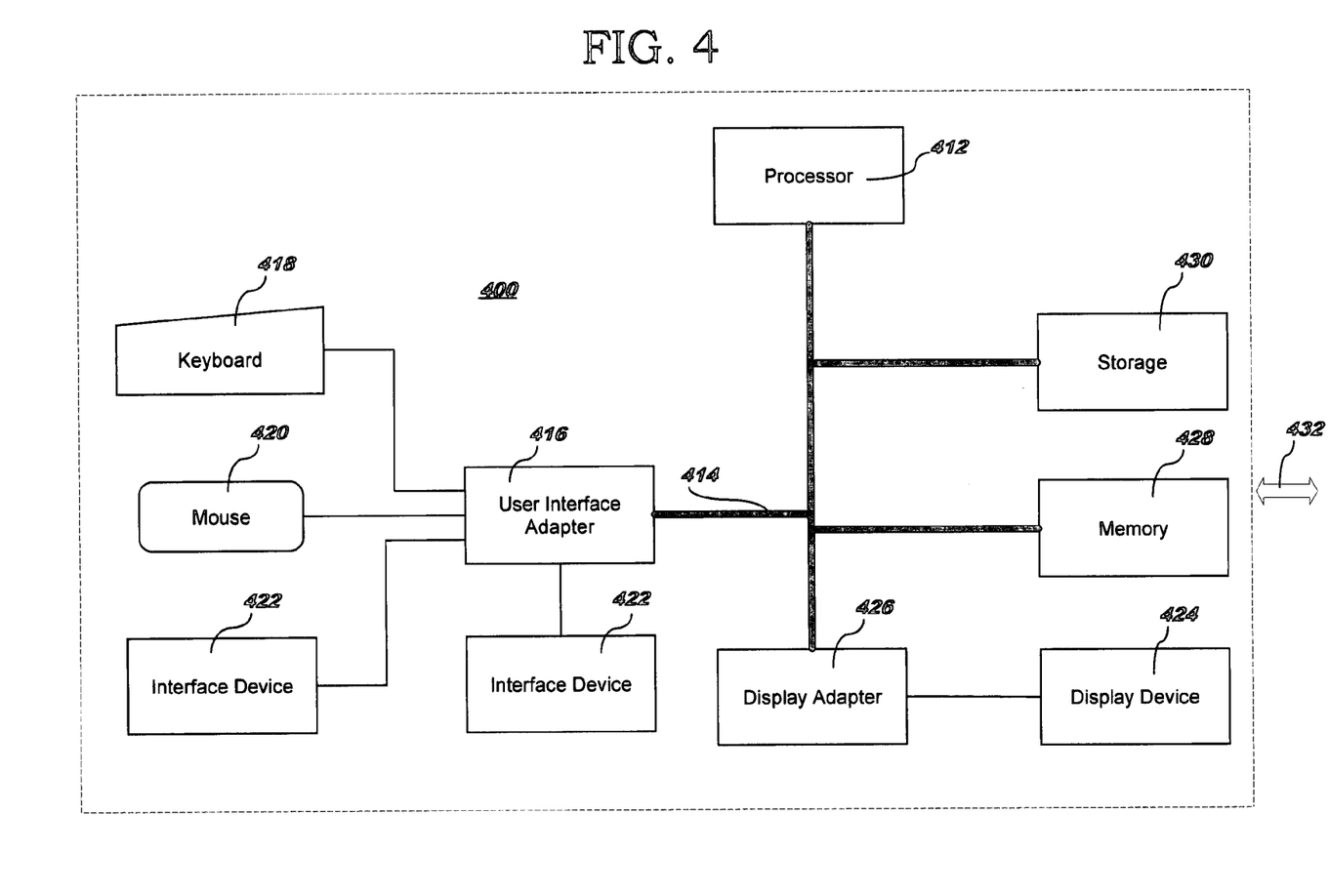
FIG. 4 illustrates a representative workstation hardware environment in which the present invention may be practiced.

FIG. 4 illustrates a representative workstation hardware environment in which the present invention may be practiced. The environment of FIG. 4 comprises a representative single user computer workstation 400, such as a personal computer, including related peripheral devices. The workstation 400 includes a microprocessor 412 and a bus 414 employed to connect and enable communication between the microprocessor 412 and the components of the workstation 400 in accordance with known techniques. The workstation 400 typically includes a user interface adapter 416, which connects the microprocessor 412 via the bus 414 to one or more interface devices, such as keyboard 418, mouse 420, and/or other interface devices 422, which can be any user interface device, such as a touch sensitive screen, digitized entry pad, etc. The bus 414 also connects a display device 424, such as an LCD screen or monitor, to the microprocessor 412 via a display adapter 426. The bus 414 also connects the microprocessor 412 to memory 428 and long term storage 430 which can include a hard drive, tape drive, etc.

The workstation 400 communicates via a communications channel 432 with other computers or networks of computers. The workstation 400 may be associated with such other computers in a local area network (LAN) or a wide area network, or the workstation 400 can be client in a client/server arrangement with another computer, etc. All of these configurations, as well as the appropriate communications hardware and software, are known in the art.

Figure 5:
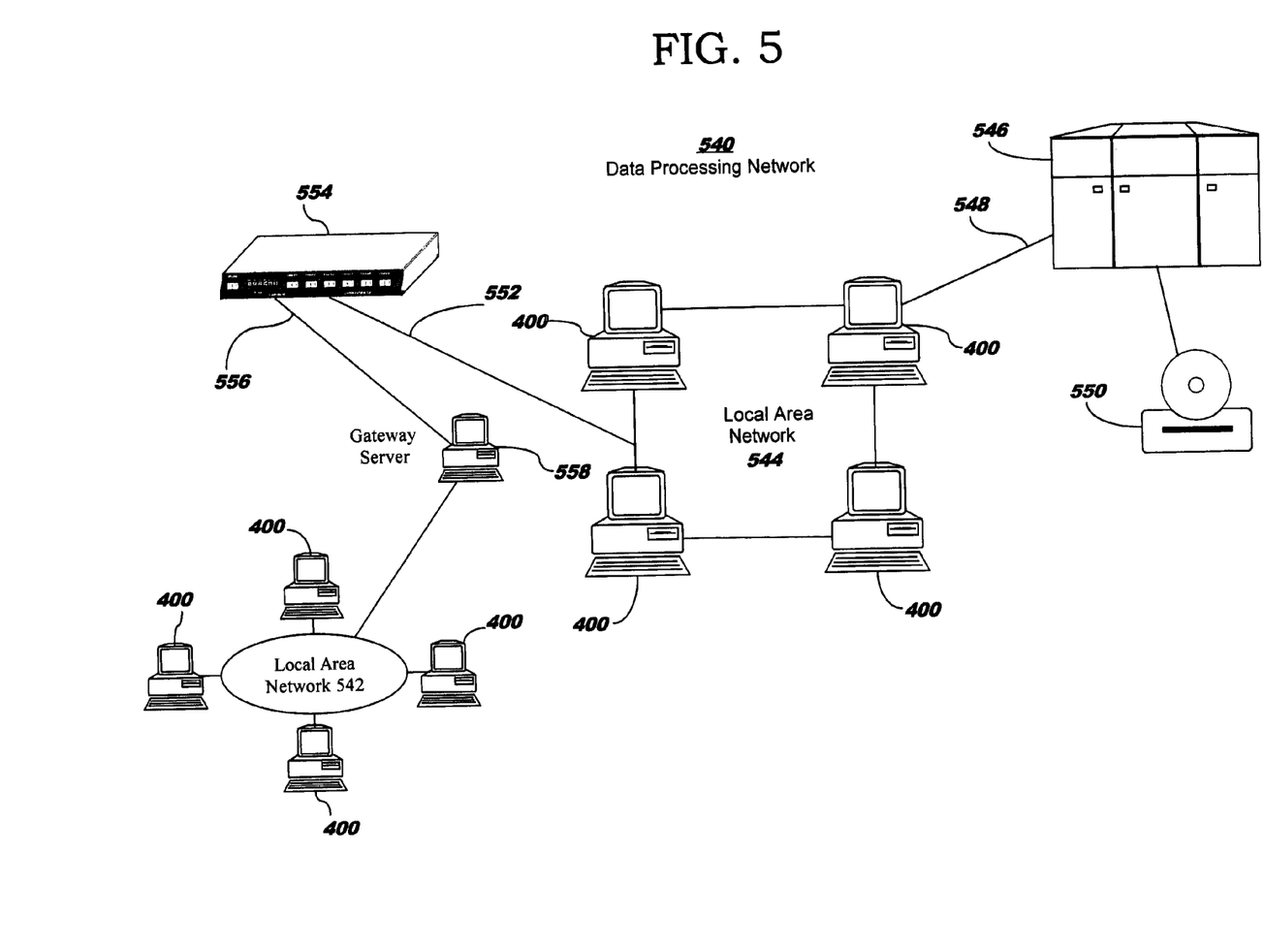
FIG. 5 illustrates a data processing network in which the present invention may be practiced.

FIG. 5 illustrates a data processing network 540 in which the present invention may be practiced. The data processing network 540 includes a plurality of individual networks, including LANs 542 and 544, each of which includes a plurality of individual workstations 400. Alternatively, as those skilled in the art will appreciate, a LAN may comprise a plurality of intelligent workstations coupled to a host processor.

Still referring to FIG. 5, the data processing network 540 may also include multiple mainframe computers, such as a mainframe computer 546, which may be preferably coupled to the LAN 544 by means of a communications link 548. The mainframe computer 546 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 546 may also be coupled to a storage device 550, which may serve as remote storage for the LAN 544. Similarly, the LAN 544 may be coupled to a communications link 552 through a router 554 and a communications link 556 to a gateway server 558. The gateway server 558 is preferably an individual computer or intelligent workstation which serves to link the LAN 542 to the LAN 544.

Those skilled in the art will appreciate that the mainframe computer 546 may be located a great geographic distance from the LAN 544, and similarly, the LAN 544 may be located a substantial distance from the LAN 542. For example, the LAN 542 may be located in California, while the LAN 544 may be located in Texas, and the mainframe computer 546 may be located in New York.

Software programming code which embodies the present invention is typically stored in permanent storage of some type, such as the permanent storage 430 of the workstation 400. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for automatically updating an original URL stored in a bookmark storage area of a web browser, comprising the steps of:
   - inserting a redirect URL in an encoded web page representation associated with said original URL;
   - reading said encoded web page representation with said browser;
   - replacing said original URL stored in said bookmark storage area with said redirect URL;
   - inserting said original URL as a history URL in said bookmark storage area;
   - sending an invalid URL indication to said browser when said redirect URL is invalid; and
   - when said invalid URL indication is received by said browser, directing said browser to the address identified by said history URL.

2. A computer program product tangibly embodied on a computer readable medium for automatically updating an original URL stored in a bookmark storage area of a web browser, comprising the steps of:
   - inserting a redirect URL in an encoded web page representation associated with said original URL;
   - reading said encoded web page representation with said browser;
   - replacing said original URL stored in said bookmark storage area with said redirect URL;
   - inserting said original URL as a history URL in said bookmark storage area;
   - sending an invalid URL indication to said browser when said redirect URL is invalid; and
   - when said invalid URL indication is received by said browser, directing said browser to the address identified by said history URL.

3. A system for automatically updating an original URL stored in a bookmark storage area of a web browser, comprising the steps of:
   - inserting a redirect URL in an encoded web page representation associated with said original URL;
   - reading said encoded web page representation with said browser; and
   - replacing said original URL stored in said bookmark storage area with said redirect URL;
   - inserting said original URL as a history URL in said bookmark storage area;
   - sending an invalid URL indication to said browser when said redirect URL is invalid; and
   - when said invalid URL indication is received by said browser, directing said browser to the address identified by said history URL.

* * * * *